July 19, 1955  M. A. NADLER ET AL  2,713,378
APPARATUS FOR LAMINATING PLASTICS
Filed March 25, 1952

INVENTORS
MAX A. NADLER
ROBERT E. MEDICK
BY
William P. Lane
ATTORNEY

United States Patent Office 2,713,378
Patented July 19, 1955

2,713,378

APPARATUS FOR LAMINATING PLASTICS

Max A. Nadler, Compton, and Robert E. Medick, Inglewood, Calif., assignors to North American Aviation, Inc.

Application March 25, 1952, Serial No. 278,431

4 Claims. (Cl. 154—1)

This invention concerns a method for curing sheets of laminated plastics, and it particularly concerns a method for curing sheets of laminated plastics which have resin fillers that contain or release volatile material.

Many resins, and in particular, resins of the phenolic type contain and release volatile matter during the curing process. When one of these resins is used as a binder between the laminations of a laminated plastic sheet the vapors created during the evacuating and heating phases of the conventional vacuum bag curing process cause warping and buckling in the laminations. Therefore, conventional vacuum bag techniques are not considered satisfactory for curing laminated plastic sheets which use phenolic or other resins which release volatile matter.

When conventional vacuum bag techniques are used, a portion of the resin hardens, blocking the passage between the unhardened portions and the evacuating line. When the passage to the evacuating line is blocked the vapor pressure buckles the laminations thereby creating an unusable plastic sheet.

This invention contemplates the removal of all vapors and gases before the vapor pressure increases and causes buckling or warping of the laminations. This invention opens an entirely new field of laminating techniques for laminated plastics which use resins that contain or release volatile matter during the curing process. This invention allows vacuum bag techniques to be used on all laminated plastics. A saving in cost is realized because of the elimination of the need for positive pressure type laminating equipment.

It is therefore an object of this invention to provide a process for curing sheets of laminated plastics which utilize resins that contain or release volatile matter during the curing process.

It is another object of this invention to provide means for impregnating plastic laminations with resins which contain or release volatile matter during the curing process.

It is another object of this invention to provide a non-buckling, nonwarping method for curing sheets of laminated plastics with resins which contain or release volatile matter during the curing process.

Figure 1:
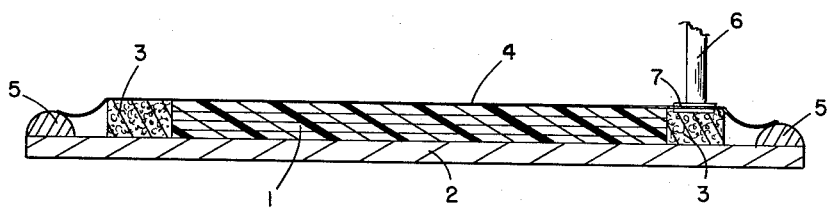
Figure 2:
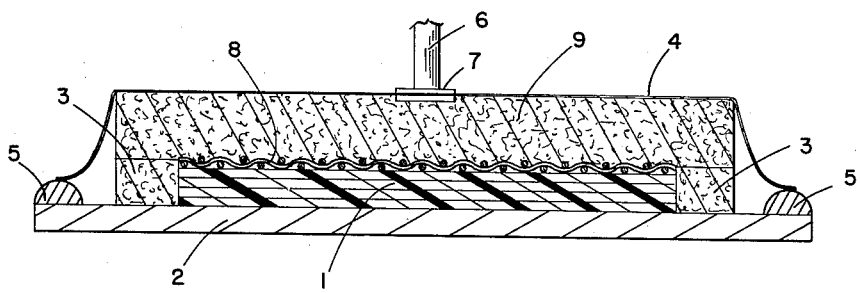

Other objects of invention will become apparent from the following description taken in connection with the accompanying drawings, in which Fig. 1 is an arrangement for curing sheets of laminated plastics by conventional vacuum bag techniques;

And Fig. 2 is a preferred arrangement for curing sheets of laminated plastics by the vacuum bag technique of this invention.

The conventional vacuum bag method for applying a force to a stack of plastic laminations is shown in Fig. 1. In Fig. 1, lamination stack 1, which contains laminations and resin, is placed upon forming die 2. Hair felt pads 3 are placed around lamination stack 1. Elastic membrane 4 is placed over lamination stack 1 and felt pads 3. Elastic membrane 4 is made airtight by attachment to sealing putty 5. Vacuum line 6 passes through elastic membrane 4 at a point over hair felt pad 3 and is attached to membrane 4 by airtight seal 7.

When a vacuum is drawn through vacuum line 6, the atmospheric pressure compresses lamination stack 1. Air and vapors from the center of lamination stack 1 must pass along the laminations to hair felt pads 3 before they are removed through vacuum line 6. The entire assembly is placed in an oven (not shown) to cure the resins. The conventional method is satisfactory only for resins which neither contain nor release volatile matter during the curing process.

When resins which contain or release volatile matter, such as resins of the phenolic types, are used, the conventional vacuum bag techniques do not cause a satisfactory result. The volatile material vaporizes but cannot escape because adjacent resin has hardened. The vapor creates a stress in the laminations and causes them to warp or buckle.

The modified vacuum bag method contemplated by this invention overcomes the difficulties encountered by the conventional method. The preferred method contemplated by this invention is explained by reference to Fig. 2. In Fig. 2, lamination stack 1 is placed upon forming die 2. Hair felt pads 3 are placed around lamination stack 1. Glass cloth 8, covered with a release agent, is placed over lamination stack 1. Hair felt pad 9 is placed over glass cloth 8. Elastic membrane 4 is placed over felt pad 9 and is made airtight by attachment to sealing putty 5. Vacuum line 6 passes through elastic membrane 4 at a point over hair felt pad 9 and is attached to membrane 4 by airtight seal 7.

When a vacuum is drawn through vacuum line 6 the atmospheric pressure compresses lamination stack 1. The vapors generated when the entire assembly is placed in an oven (not shown) move toward felt pad 9 by the shortest route. The obstructions between the vapors and pad 9 are minimized. Glass cloth 8 is provided to prevent felt pad 9 from adhering to lamination stack 1. Glass cloth 8 has a release agent, such as wax, applied, which, although not necessary, helps it to prevent the resins from sticking. Excess resins pass through glass cloth 8 and are absorbed by hair felt pad 9.

In this invention the vapors are removed from lamination stack 1 by the shortest route and are not trapped by hardened resins. Thus, buckling and warping of lamination stack 1 is eliminated. Laminated plastics which have resins that contain or release volatile matter during the curing process no longer must be formed by means of a mechanical press, but may now be formed by the relatively simple and inexpensive method of this invention.

Other materials which have a coarse structure and which will carry a release agent may be substituted for glass cloth 8. Other materials which will absorb excess resin, transmit force, and still allow vapors to pass may be substituted for felt pads 3 and 9. In order to absorb the required amount of excess resins and still keep the capillary passages free from hardened resins, the pads must be relatively thick. Elastic material 4 must be able to withstand the oven heat. In the preferred embodiment of this invention elastic material 4 is made of polyvinyl-alcohol.

Although the invention has been described and illustrated in detail, it is to be clearly understood that the same is by way of illustration and example only and is not to be taken by way of limitation, the spirit and scope of this invention being limited only by the terms of the appended claims.

We claim:

1. Means for pressing sheets of laminated plastics containing volatile resins comprising a hard unyielding surface, said laminated plastic being positioned against said surface; a sheet of rough weave material, said material having a release agent applied thereto, said material covering the surface of said laminated plastic opposite the unyielding surface; a plurality of removable relatively stiff pads having porosity in all directions, said pads being placed around the edges of said laminated plastic and covering said rough weave material, said pads which cover said rough weave material being sufficiently thick to absorb all of the resin released from said plactics; an elastic membrane, said membrane covering said pads; a vacuum line situated above the pad-covered rough weave material, said vacuum line passing through and airtightly sealed to said membrane; sealing means for making an airtight seal between said elastic membrane and said unyielding surface, whereby the space between said membrane and said surface is evacuated, causing the atmosphere to press said laminated plastic.

2. A device as recited in claim 1 in which said rough weave material is a glass cloth.

3. A device as recited in claim 1 in which said thick porous relatively stiff pads are hair felt.

4. An apparatus for curing laminated plastics having a volatile resin-containing binder comprising an unyielding surface upon which the uncured laminates are placed, a releasable, rough weave spacing sheet member adapted to be placed over the uncured laminates, resin-absorbing relatively thick material having porosity in all directions situated above said spacing member and around the periphery of the laminates, an elastic membrane completely enclosing said porous material and in sealed relationship with said unyielding surface, and vacuum-line means extending through said membrane and above said sheet member and the porous material above said member, whereby the laminates are cured under pressure and the volatiles in the binder are absorbed by the porous material.

References Cited in the file of this patent

UNITED STATES PATENTS

| | | |
|---|---|---|
| 2,088,352 | Vierkotter | July 27, 1937 |
| 2,184,828 | Woodman | Dec. 26, 1939 |
| 2,255,019 | Wolters | Sept. 2, 1941 |
| 2,397,827 | Williams | Apr. 2, 1946 |
| 2,456,093 | Swedlow | Dec. 14, 1948 |
| 2,478,165 | Collins | Aug. 2, 1949 |